Nov. 15, 1938.    H. H. THOMAS    2,136,898
DRAIN VALVE
Filed Aug. 16, 1937
FIG. 1.
FIG. 2.
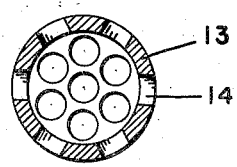
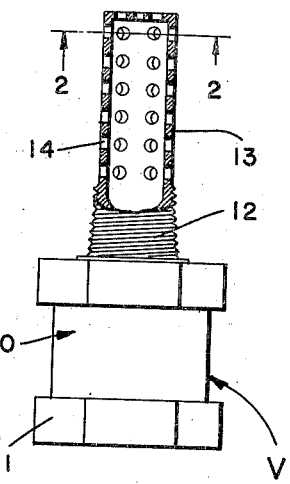
FIG. 3.
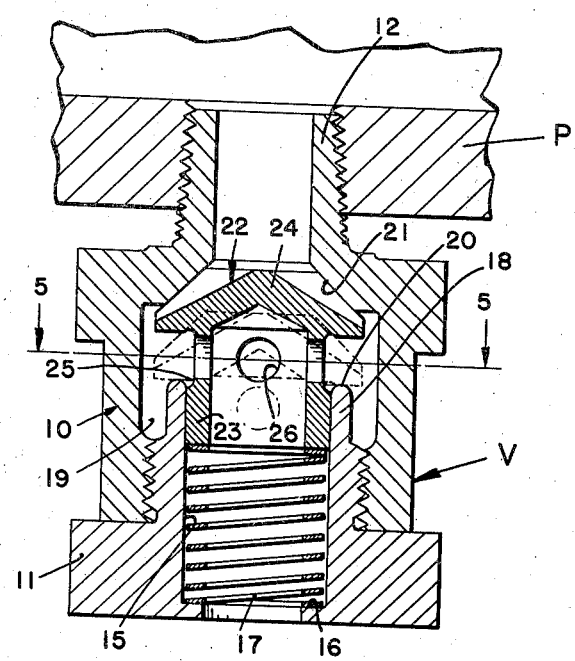
FIG. 5.
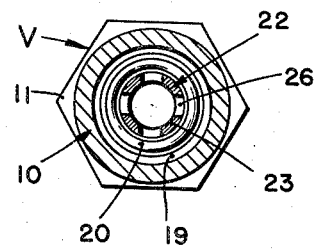
FIG. 4.
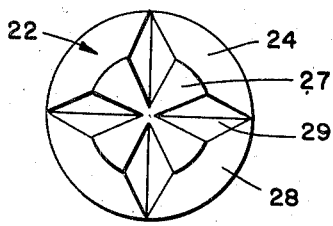
INVENTOR
HENRY H. THOMAS
BY
ATTORNEYS Patented Nov. 15, 1938

2,136,898

UNITED STATES PATENT OFFICE 2,136,898

DRAIN VALVE

Henry H. Thomas, Clinton, Iowa

Application August 16, 1937, Serial No. 159,360

2 Claims. (Cl. 137—34.2)

This invention appertains to valves, and more particularly to a novel drain valve for use in conjunction with a system or apparatus utilizing steam, such as on locomotive booster lines, locomotive blower lines, or on any line where a drain is necessary.

One of the primary objects of my invention is to provide a valve for automatically draining water of condensation from a pipe line, and which is so constructed and arranged as to effectively and completely prevent the escape of steam therefrom.

Another salient object of my invention is to provide an automatic drain valve for pipe lines, which will effectively break up carbon deposits, and other sediment, whereby the valve will open and close under all normal working conditions.

A further important object of my invention is to provide a drain valve having a raised valve seat, and an overlapping valve body therefor, with means for draining the water of condensation through said valve body when the same is raised off its seat, an arrangement insuring the proper operation of the valve and preventing all sediment collection on the valve body and seat.

A still further object of my invention is to provide an automatic drain valve, which will be durable and efficient in use, one that will be simple and easy to manufacture and keep in repair, and one which can be placed upon the market and incorporated with a pipe line at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a side elevation, partly in section, of one form of my novel drain valve, which is particularly adapted for use on lines in which large pieces of debris are liable to be encountered, such as on booster lines.

Figure 2 is a transverse section through the screen of the valve, taken on the line 2—2 of Figure 1, looking in the direction of the arrows, the view being on a larger scale than Figure 1.

Figure 3 is an enlarged central, vertical section through my novel valve, showing the same connected to a pipe line, the screen in this form being eliminated.

Figure 4 is a top plan view of the valve body.

Figure 5 is a section through the valve, taken on the line 5—5 of Figure 3, looking in the direction of the arrows, the view being on a smaller scale than Figures 3 and 4.

Referring to the drawing in detail, wherein similar reference characters designate corresponding parts throughout the several views, the letter V generally indicates my improved valve for association with a pipe line P.

My valve V is adapted to be associated with any line requiring a drain, and is particularly useful on locomotive booster lines, blower lines, and the like. Where the valve is used in conjunction with a booster line, the same is tapped into both the exhaust and the live steam lines, as can be readily understood by those skilled in the art.

The valve V comprises a valve housing or casing 10, the lower end of which is closed by a suitable closure member, which can be in the nature of a plug 11. The upper end of the valve housing or casing 10 carries an externally threaded nipple 12, whereby the same can be tapped into a pipe line P. The bore of this nipple communicates with the interior of the housing 10, as can be readily seen by referring to Figure 3. Where the valve is to be used on pipe lines in which large pieces of debris, such as packing, is liable to be encountered, the nipple 12 can carry a screen 13, as shown in Figures 1 and 2 of the drawing. This screen 13 is in the nature of a sleeve, and forms a continuation of the nipple. The sleeve is closed at its outer end, and this end, and the sleeve itself, are provided with a plurality of minute perforations 14.

The inner surface of the lower end of the housing or casing 10 is internally threaded for receiving the threaded portion of the plug 16, and the plug has one portion thereof provided with a polygonal face so as to form a wrench-engaging surface. An axially disposed bore 15 is formed in the plug, and the bore at its outer end is reduced in diameter to form a seat 16 for an expansion coil spring 17. The inner end of the plug is provided with a sleeve extension 18 of a lesser diameter than the outer diameter of the plug, and hence when the plug is threaded into the valve casing or housing 10, the same is spaced from the outer wall of said housing or casing, whereby to form an annular basin 19. The inner end of the sleeve 18 terminates in spaced relation to the inner wall of the casing or housing 10, and the same is of an arcuate shape in cross section to form a valve seat 20. The inner surface of the inner end of the valve casing or housing 10 around the nipple 12 is beveled to form a rest and a stop shoulder 21, as will be hereinafter more fully set forth.

Arranged within the valve casing or housing 10 is the valve member or body 22. Particular attention is invited to the construction of this valve body, and it is to be noted that the same includes a depending hollow valve stem 23 closed at its inner end by the valve head 24 which extends beyond the stem. The stem 23, adjacent to the head 24, has formed on its outer surface an annular groove 25, and this groove extends under the valve head. The stem at this portion is also provided with a plurality of drain apertures or ports 26.

The outer surface of the valve head 24 has formed thereon a flat central portion 27, and an outer beveled surface 28. Radial V-shaped channels or grooves 29 are formed in the outer surface of the head.

In assembling, my valve spring 17 is placed on its seat 16 in the bore 15 of the plug, after which the hollow stem 23 of the valve body 22 is placed in the bore on top of the spring. The plug 11 is now threaded tightly into the housing or casing 10, and the spring 17 will normally hold the valve body 22 in a raised position against the rest stop 21.

In use of my valve, when water collects in the line for any reason, the same will flow into the nipple 12 through the channels 29, and into the housing or casing 10, and will circulate down in the basin 19 and then up through the openings 26, and thence out through the center of the spring.

Great stress is laid on the raised valve seat 20, the basin 19, and the channels 29, as by this arrangement and construction collection of debris is prevented, and the draining of the line is assured as well as the seating of the valve. The channels 29 tend to break up any debris entering the casing with the water, and the debris, striking against the walls of the basin, is further broken up. The water with the debris will flow out directly through the valve stem 23. The openings in the valve stem, and the diameter of the valve stem, are such that free flow is insured.

After the water of condensation is drained from the line, the steam following the water enters the valve. The steam pressure will overcome the tension of the spring 17, thus moving the valve body against the tension of the spring, and holding the valve on its seat, as shown in dotted lines in Figure 3. The rounded or oval surface of the valve seat is important, and the overlapping valve head resting upon the seat insures a tight fit so as to prevent the escape of steam.

While I have shown a central water escape opening in the plug 11, it is to be understood that side escape oepnings can be provided, or in fact any desired type of escape openings or ports can be utilized.

Other changes in details can be made without departing from the spirit or the scope of my invention, but what I claim as new is:

1. A drain valve for pipe lines comprising a valve casing having a nipple for connection with a pipe line at one end, a removable plug closing the opposite end of the casing, said plug having an axial bore and a port communicating with the bore and the atmosphere, a sleeve extension on the plug having a curved valve seat on its inner end, said sleeve forming in conjunction with the casing a depressed basin around the valve seat, whereby said valve seat will be raised above the outer end of the casing, the inner wall of the casing around the nipple having a beveled stop surface, a valve body having a hollow stem slidably mounted in the sleeve, and a head extending beyond the sleeve for overlapping the valve seat, said stem being provided with openings therein adjacent to the head, an expansion spring in the bore engaging the stem normally holding the valve body in raised position with the head off of the seat and the openings communicating with the interior of the valve casing, the outer surface of the valve head being provided with a flat central face and an annular beveled face for engaging the beveled surface of the casing, and said valve head being provided with radial channels whereby to connect the nipple with the interior of the casing.

2. A drain valve for pipe lines comprising a valve casing having a nipple for connection with a pipe line at one end, a removable plug closing the oposite end of the casing, said plug having an axial bore and a port communicating with the bore and the atmosphere, a sleeve extension on the plug having a curved valve seat on its inner end, said sleeve forming in conjunction with the casing a depressed basin around the valve seat, whereby said valve seat will be raised above the outer end of the casing, the inner wall of the casing around the nipple having a beveled stop surface, a valve body having a hollow stem slidably mounted in the sleeve, a head extending beyond the sleeve for overlapping the valve seat, said stem being provided with openings therein adjacent to the head, an expansion spring in the bore engaging the stem normally holding the valve body in raised position with the head off of the seat and the openings communicating with the interior of the valve casing, the outer surface of the valve head being provided with a flat central face and an annular beveled face for engaging the beveled surface of the casing, and said valve head being provided with radial channels whereby to connect the nipple with the interior of the casing, said valve stem being provided with an annular groove on its outer surface adjacent to the head, said groove extending under said head.

HENRY H. THOMAS.